United States Patent
Huang

(10) Patent No.: US 9,503,205 B1
(45) Date of Patent: Nov. 22, 2016

(54) MEASURING DEVICE FOR MEASURING SIGNAL STRENGTH OF A RADIO FREQUENCY SIGNAL RECEIVED BY AN ANTENNA

(71) Applicant: TRANS ELECTRIC CO., LTD., Changhua (TW)

(72) Inventor: Jeffrey Huang, Changhua (TW)

(73) Assignee: TRANS ELECTRIC CO., LTD., Changhua (TW)

( * ) Notice: Subject to any disclaimer, the term of this patent is extended or adjusted under 35 U.S.C. 154(b) by 0 days.

(21) Appl. No.: 14/994,217

(22) Filed: Jan. 13, 2016

(30) Foreign Application Priority Data

Aug. 25, 2015 (TW) .............................. 104213749 U

(51) Int. Cl.
*H04B 17/00* (2015.01)
*H04B 17/318* (2015.01)
*H04B 17/23* (2015.01)
*H04B 1/16* (2006.01)

(52) U.S. Cl.
CPC ............ *H04B 17/318* (2015.01); *H04B 17/23* (2015.01)

(58) Field of Classification Search
CPC ... H04B 1/1027; H04B 17/23; H04B 17/318
USPC ............................................ 455/226.1–226.4
See application file for complete search history.

(56) References Cited

U.S. PATENT DOCUMENTS

2007/0197207 A1* 8/2007 Carstens ............. H04W 88/085
455/423
2010/0167670 A1* 7/2010 Gilbert ................. H03G 3/3047
455/127.2

* cited by examiner

*Primary Examiner* — Lee Nguyen
(74) *Attorney, Agent, or Firm* — McClure, Qualey & Rodack, LLP

(57) ABSTRACT

A measuring device for measuring signal strength of an RF signal received by an antenna includes a measurement unit, a processing unit and a display unit. The measurement unit includes a band-pass filter for filtering an antenna signal received from the antenna, an amplifier for amplifying the filtered signal according to a gain value, and an RF log detector for outputting a voltage signal according to power level of the amplified signal based on a logarithmic slope. The processing unit obtains a strength signal according to the voltage signal, the gain value and the logarithmic slope. The display unit displays an indication of the signal strength of the RF signal according to the strength signal.

7 Claims, 3 Drawing Sheets

MEASURING DEVICE FOR MEASURING SIGNAL STRENGTH OF A RADIO FREQUENCY SIGNAL RECEIVED BY AN ANTENNA

CROSS-REFERENCE TO RELATED APPLICATION

This application claims priority of Taiwanese Application No. 104213749, filed on Aug. 25, 2015.

FIELD

The disclosure relates to a measuring device, and more particularly to a measuring device for measuring signal strength of a radio frequency signal received by an antenna.

BACKGROUND

Radio frequency (RF) signals with a high frequency band used for audio/video transmission of a digital television are easily blocked by buildings or landform, and multipath interference may occur in transmission of the RF signals due to signal reflection. Therefore, in order to receive the RF signals with a relatively great quality, an antenna used for receiving the RF signals is usually set up outdoors and at a relatively high place. However, in this kind of setup, the antenna may be far from a media playing device (e.g., a digital television) that is used for playing media content carried by the RF signals. In addition, the antenna and the media playing device may be placed on different floors. As a result, it is hard to check immediately whether the placement of the antenna results in the best quality of the received RF signals.

In order to perform the checking, two persons need to cooperate with each other. One person watches the media played by the media playing device to determine the quality of the received RF signals, and guides the other person to adjust the placement of the antenna. However, this is inconvenient and time consuming. Further, the determination of the quality of the received RF signals is a subjective determination, and there is no objective standard to determine whether the placement of the antenna is optimal.

Another way to check immediately the placement of the antenna is to measure the RF signals using an instrument which can measure signal strength of the RF signals at a particular location and provide objective measurement result to a user, such that the user can adjust the antenna according to the measurement result. However, the measurement result of the signal strength is related to the RF signals received by the instrument, and thus, there may be a difference from the signal strength of the RF signals actually received by the antenna. Besides, the instrument displays a value to indicate the measurement result. Generally speaking, a greater value means greater signal strength. However, the RF signals having excessive signal strength may cause distortion of the media played by the media playing device, and ordinary people not skilled in the art is not knowledgeable in the appropriate range of the value.

SUMMARY

Therefore, an object of the disclosure is to provide a measuring device for measuring signal strength of a radio frequency (RF) signal received by an antenna.

According to the disclosure, the measuring device includes a measurement unit, a processing unit and a display unit.

The measurement unit includes an input port, a band-pass filter, an amplifier and an RF log detector. The input port is configured to be connected to the antenna. The band-pass filter is configured to receive from the antenna via the input port an antenna signal that is associated with the RF signal, and to filter the antenna signal by passing signal components of the antenna signal that have frequencies within a specific frequency band so as to output a filtered signal. The amplifier is configured to receive the filtered signal from the band-pass filter, and to amplify the filtered signal according to a gain value so as to output an amplified signal. The RF log detector is configured to receive the amplified signal from the amplifier, and to output a voltage signal according to power level of the amplified signal based on a logarithmic slope.

The processing unit is electrically connected to the measurement unit. The processing unit is configured to receive the voltage signal, and to obtain a strength signal according to the voltage signal, the gain value and the logarithmic slope.

The display unit is electrically connected to the processing unit. The display unit is configured to receive the strength signal, and to display an indication of the signal strength of the RF signal according to the strength signal.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
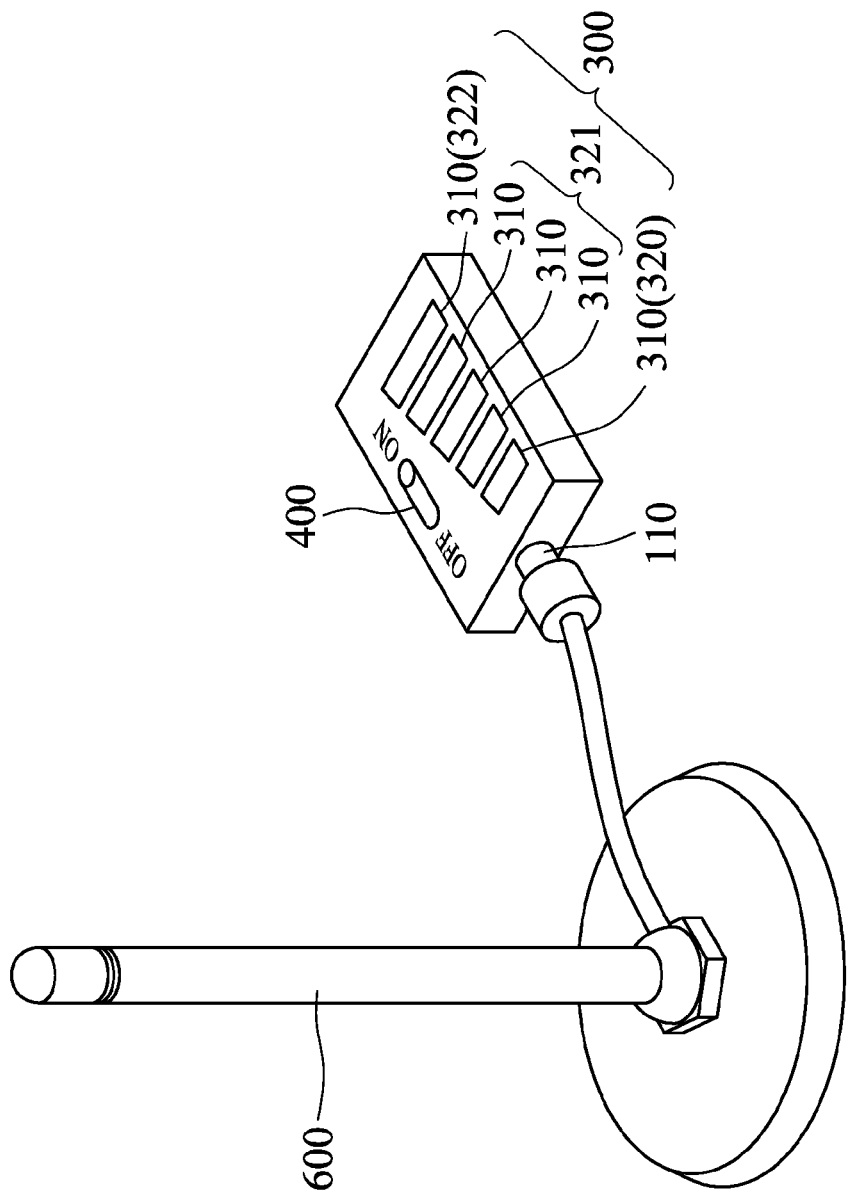
FIG. 1 is a schematic diagram illustrating an embodiment of a measuring device connected to an antenna according to the disclosure.
Figure 2:
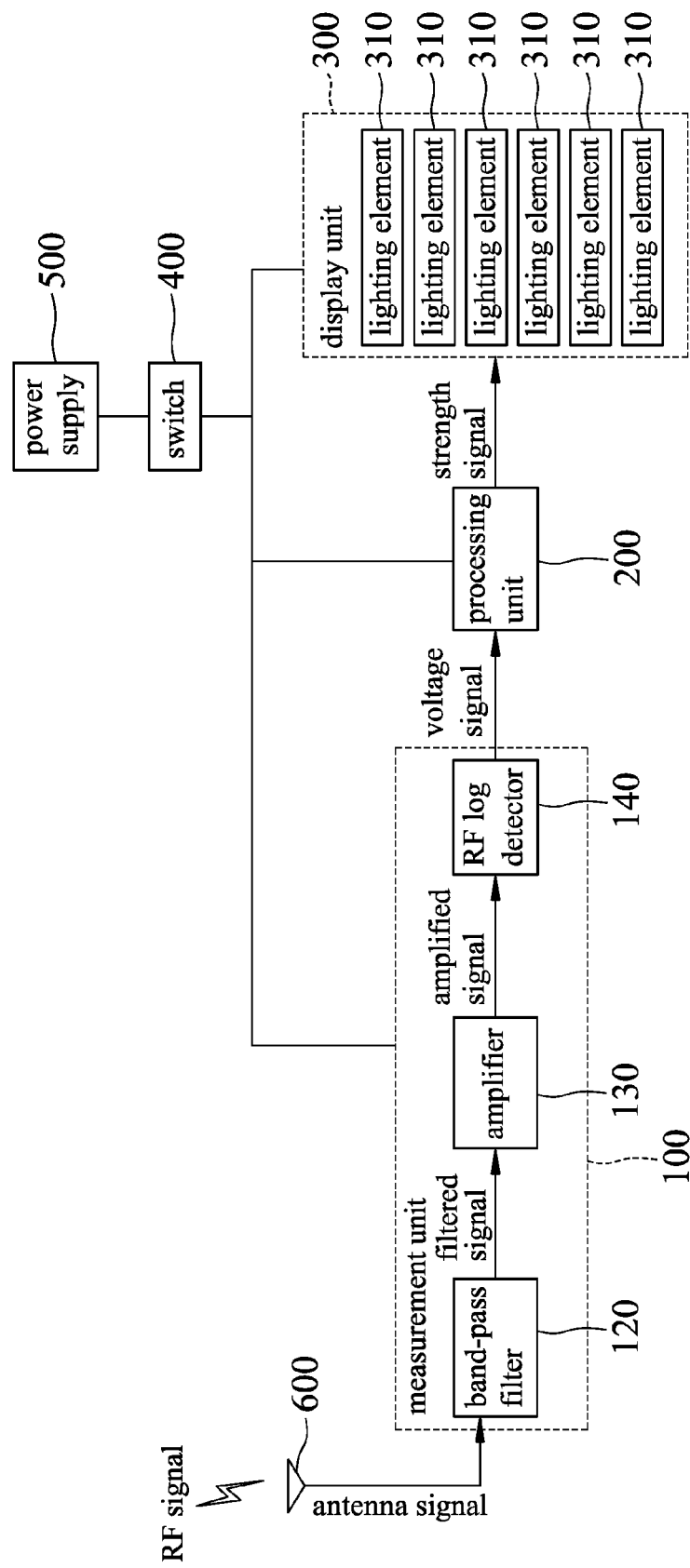
FIG. 2 is a block diagram illustrating the embodiment of the measuring device according to the disclosure.

Referring to FIGS. 1 to 2, the embodiment of a measuring device for measuring signal strength of a radio frequency (RF) signal received by an antenna 600 according to this disclosure is described below.

The measuring device includes a measurement unit 100, a processing unit 200, a display unit 300, a switch 400 and a power supply 500. The antenna 600 is configured to receive the RF signal, and to output an antenna signal that is associated with the RF signal.

Figure 3:
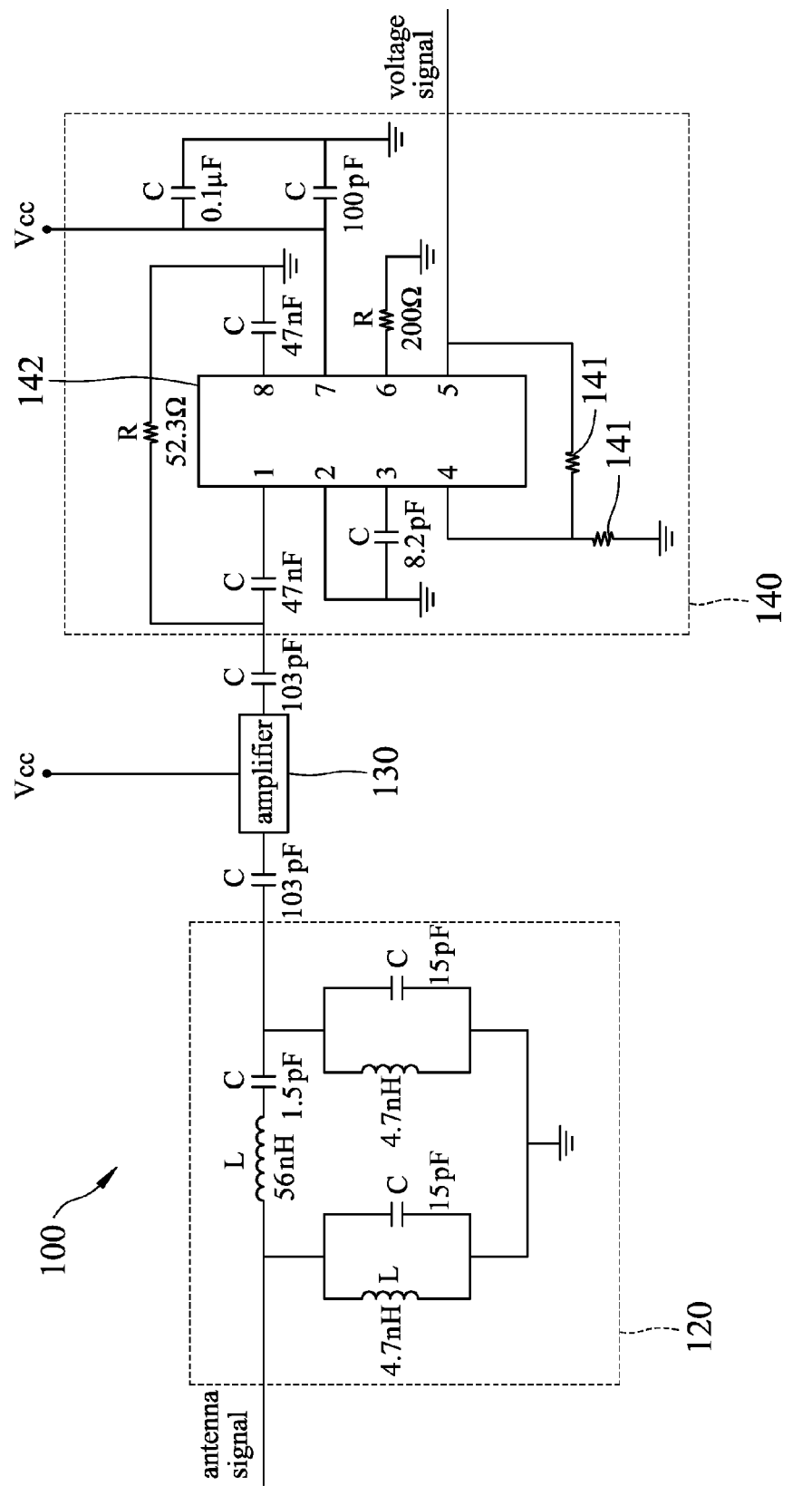
FIG. 3 is a circuit diagram illustrating a measurement unit of the embodiment.

Referring to FIGS. 1 to 3, the measurement unit 100 includes an input port 110, a band-pass filter 120, an amplifier 130 and an RF log detector 140. The RF log detector 140 includes two resistors 141 connected to each other in series at a common node (N), and a demodulating logarithmic amplifier 142 having a setpoint control input electrically connected to the common node (N) of the resistors 141. In this embodiment, the amplifier 130 is a low noise amplifier.

The display unit 300 includes a plurality of lighting elements 310 configured to light with different colors and are grouped into a plurality of signal strength indicators 320-322 according to the colors of the light emitted by the lighting elements 310. In particular, each of the signal strength indicators 320-322 consists of at least one of the lighting elements 310 and corresponds to light having a respective color. In this embodiment, each of the lighting elements 310 is a light-emitting diode (LED), and the number of the signal strength indicators is three.

The switch 400 is electrically coupled to the power supply 500, and is configured to allow the power supply 500 to supply electric power to the measurement unit 100, the processing unit 200 and the display unit 300. For example, the switch 400 is user-operable, and makes the power supply 500 provide the electric power when the switch 400 is turned on. To be noted, the power supply 500 applies a bias voltage (Vcc) to each of the amplifier 130 and the RF log detector 140 as shown in FIG. 3. The bias voltages (Vcc) applied respectively to the amplifier 130 and the RF log detector 140 may have different voltage values, and may be decreased or increased according to design requirement of the circuit of the measuring device.

The band-pass filter 120 is configured to be electrically coupled to the antenna 600 via the input port 100. The band-pass filter 120 is configured to receive from the antenna 600 via the input port 110 the antenna signal, and to filter the antenna signal by passing signal components of the antenna signal that have frequencies within a specific frequency band so as to output a filtered signal. In this embodiment, the specific frequency band ranges from 470 MHz to 700 MHz, which is the frequency band for digital television signals. In this embodiment, the band-pass filter 120 is embodied as an LC circuit for filtering the antenna signal. The amplifier 130 is configured to receive the filtered signal from the band-pass filter 120, and to amplify the filtered signal according to a gain value so as to output an amplified signal. To be noted, the amplifier 130 requires a low noise factor and a high gain value, and has an impedance matching with an input circuit thereof (i.e., the band-pass filter 120). Since the amplifier 130 has a low noise factor and a high gain value, a noise factor of the whole circuit of the measuring device is decreased. Thus, the measuring device can have a relatively great sensitivity to receipt of signals having relatively low signal strength.

The RF log detector 140 is configured to receive the amplified signal from the amplifier 130, and to output a voltage signal according to power level of the amplified signal based on a logarithmic slope. In this embodiment, the RF log detector 140 is embodied as an integrated circuit. According to a data sheet of the demodulating logarithmic amplifier 142, the demodulating logarithmic amplifier 142 has a fourth pin serving as the setpoint control input, and the logarithmic slope is a ratio of a voltage value of the voltage signal to the power level of the amplified signal and is a negative value (−22V/dBm) and is positively proportional to voltage at the setpoint control input (i.e., the voltage at the common node (N)). The resistors 141 are electrically connected between a fifth pin of the demodulating logarithmic amplifier 142 (i.e., a measurement and controller output) and ground, and the fourth pin is electrically connected to the common node (N). By designing resistance values respectively of the resistors 141, the logarithmic slope is set up at a range between −22 V/dBm and −66 V/dBm. In addition, the logarithmic slope is related to sensitivity about determination of the signal strength, and to a measurement range of the power level of the amplified signal that is acceptable to the RF log detector 140. In detail, for the same variation of the voltage signal in voltage, a smaller absolute value of the logarithmic slope results in a greater measurement range of the power level of the amplified signal and a lower sensitivity about the variation of the voltage signal. On the contrary, with a greater absolute value of the logarithmic slope, the measurement range becomes smaller, and the sensitivity about the variation of the voltage signal becomes higher. In practice, the value of the logarithmic slope can be adjusted according to the receiving performance of the antenna 600. Better receiving performance of the antenna 600 means that the variation of the power level of the amplified signal is more significant, and the absolute value of the logarithmic slope can be smaller. On the contrary, when the antenna 600 has poorer receiving performance, the absolute value of the logarithmic slope should be greater.

To be noted, since the antenna signal is a high-frequency signal, the antenna signal may be returned when electrical impedances of electronic components of the measuring device do not match. Therefore, the band-pass filter 120, the amplifier 130 and the RF log detector 140 of the measurement unit 100 need to be carefully designed for the impedance matching. As shown in FIG. 3, the circuit diagram of the measurement unit 100 illustrates impedance values respectively of several passive components (such as resistors (R), capacitors (C) and inductors (L)) and connection relationship thereamong for the impedance matching. Another way to achieve the impedance matching is to use discrete circuits including individual electronic components or to use a printed circuit board. In practice, the Smith chart is used to assist in the impedance matching.

The processing unit 200 is electrically connected to the measurement unit 100, and is configured to receive the voltage signal from the RF log detector 140, to obtain a strength signal according to the voltage signal, the gain value and the logarithmic slope, and to output the strength signal to the display unit 300. In this embodiment, the strength signal is expressed in decibels (dBs), and the processing unit 200 is configured to compute the strength signal according to the following equation:

$$S=V/(G \times m),$$

where S is the strength signal, V is the voltage value of the voltage signal, G is the gain value, and m is the logarithmic slope.

The display unit 300 is electrically connected to the processing unit 200, and is configured to receive the strength signal and to display an indication of the signal strength of the RF signal according to the strength signal. To be noted, rather than by the numeral, the display unit 300 displays the indication of the signal strength in a direct, intuitive way by a number of the lighting elements 310 that emit light and by the colors of the light emitted by the lighting elements 310. In this embodiment, the signal strength indicator 322 has one lighting element 310 that is configured to emit red light, and is used to indicate that the signal strength is greater than an upper limit. The signal strength indicator 320 has one lighting element 310 that is configured to emit yellow light, and is used to indicate that the signal strength is lower than a lower limit or at a barely acceptable value. The signal strength indicator 321 has three lighting elements 310 that are configured to emit green light for indicating that the signal strength is within an appropriate range between the upper limit and the lower limit. In other embodiments, the number of the lighting elements 310 of the signal strength indicator 321 can be any number more than one. The signal strength within the appropriate range is further quantified and indicated by a number of the lighting elements 310 that are emitting green light. For example, when the signal strength is lower than 37 dBµV, the lighting element 310 of the signal strength indicator 320 emits yellow flashlight to indicate that the signal strength is too weak. When the signal strength is between 37 dBμV and 49 dBμV, the lighting element 310 of the signal strength indicator 320 continuously emits yellow light to inform the user that the signal strength is barely acceptable and the user should look for a better place for setting up the antenna 600 and adjust arrangement of the antenna 600. When the signal strength is between 50 dBμV and 80 dBμV, the lighting elements 310 are turned on to emit green light one by one for every 10 dBμV difference from 50 dBμV to 80 dBμV for quantifying the signal strength. The signal strength of the RF signal between 50 dBμV and 80 dBμV is sufficient for a media playing device to play clear media content associated with the RF signal. However, the signal strength of the RF signal may vary due to the weather and the transmission cable, and thus, the signal strength indicator 321 has more than one lighting element 310 for providing relatively more precise indication of the signal strength. When the signal strength is greater than 80 dBμV, it means that the signal strength is too high, and the lighting element 310 of the signal strength indicator 322 is turned on to emit red light to inform the user to look for a better place for setting up the antenna 600 or adjust the arrangement of the antenna 600.

In sum, by virtue of the lighting elements 310, the measuring device can quantify the signal strength of the RF signal received from the antenna 600 with reference to a number of the lighting elements 310 turned on to emit light and the color of the light emitted by the lighting elements 310. Thus, the measuring device according to this disclosure can help the user directly find a better place for setting up the antenna 600 or adjust the arrangement of the antenna 600 to obtain better signal strength.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A measuring device for measuring signal strength of a radio frequency (RF) signal received by an antenna, said measuring device comprising:
   a measurement unit including
      an input port configured to be connected to the antenna,
      a band-pass filter configured to receive from the antenna via said input port an antenna signal that is associated with the RF signal, and to filter the antenna signal by passing signal components of the antenna signal that have frequencies within a specific frequency band so as to output a filtered signal,
      an amplifier configured to receive the filtered signal from said band-pass filter, and to amplify the filtered signal according to a gain value so as to output an amplified signal, and
      an RF log detector configured to receive the amplified signal from said amplifier, and to output a voltage signal according to power level of the amplified signal based on a logarithmic slope;
   a processing unit electrically connected to said measurement unit, and configured to receive the voltage signal, and to obtain a strength signal according to the voltage signal, the gain value and the logarithmic slope; and
   a display unit electrically connected to said processing unit, and configured to receive the strength signal and to display an indication of the signal strength of the RF signal according to the strength signal.

2. The measuring device as claimed in claim 1, wherein the logarithmic slope is a ratio of a voltage value of the voltage signal to the power level of the amplified signal, and ranges from −22 V/dBm to −66 V/dBm.

3. The measuring device as claimed in claim 1, wherein said RF log detector includes two resistors connected to each other in series at a common node, and a demodulating logarithmic amplifier having a setpoint control input electrically connected to the common node of said resistors, and wherein the logarithmic slope is related to voltage at the common node.

4. The measuring device as claimed in claim 1, further comprising a switch electrically coupled to a power supply, and configured to allow the power supply to provide electric power to said measurement unit, said processing unit and said display unit.

5. The measuring device as claimed in claim 1, wherein said band-pass filter is configured to filter the antenna signal by passing the signal components of the antenna signal that have frequencies within the specific frequency band ranging from 470 MHz to 700 MHz.

6. The measuring device as claimed in claim 1, wherein said amplifier is a low noise amplifier.

7. The measuring device as claimed in claim 1, wherein said display unit has a plurality of light-emitting diodes.

* * * * *

UNITED STATES PATENT AND TRADEMARK OFFICE
CERTIFICATE OF CORRECTION

PATENT NO. : 9,503,205 B1  
APPLICATION NO. : 14/994217  
DATED : November 22, 2016  
INVENTOR(S) : Jeffrey Huang Page 1 of 1

It is certified that error appears in the above-identified patent and that said Letters Patent is hereby corrected as shown below:

In the Specification (1) In Column 3, Line 51, please replace "(-22V/dBm)" with "(-22mV/dB)".

(2) In Column 3, Line 59, please replace "-22V/dBm" with "-22mV/dB.".

(3) In Column 3, Line 59, please replace "-66V/dBm" with "-66mV/dB".

In the Claims (4) In Column 6, Line 24 (Line 4 of Claim 2), please replace "-22V/dBm" with "-22mV/dB".

(5) In Column 6, Line 24 (Line 4 of Claim 2), please replace "-66V/dBm" with "-66mV/dB".

Signed and Sealed this  
Fifteenth Day of October, 2019

Andrei Iancu  
*Director of the United States Patent and Trademark Office*